United States Patent [19]
Endo et al.

[11] Patent Number: 5,277,729
[45] Date of Patent: Jan. 11, 1994

[54] METHOD OF MANUFACTURING POLARIZABLE ELECTRODE FOR ELECTRIC DOUBLE-LAYER CAPACITOR

[75] Inventors: Masanori Endo; Kouichi Watanabe; Kouichi Tanaka; Hiroyuki Mukouyama, all of Kyoto, Japan

[73] Assignee: Murata Manufacturing Co., Ltd., Japan

[21] Appl. No.: 849,792

[22] Filed: Mar. 11, 1992
(Under 37 CFR 1.47)

Related U.S. Application Data

[63] Continuation-in-part of Ser. No. 490,918, Mar. 8, 1990, abandoned.

[30] Foreign Application Priority Data

Mar. 8, 1989 [JP] Japan ................... 1-56700

[51] Int. Cl.$^5$ ................ C04B 35/00; B29C 67/20
[52] U.S. Cl. .................... 156/157; 264/105; 264/175; 264/280
[58] Field of Search ........... 264/104, 105, 175, 280, 264/310, 311, 320; 156/157, 292

[56] References Cited

U.S. PATENT DOCUMENTS

| | | | |
|---|---|---|---|
| 2,938,236 | 5/1960 | Robb | 18/55 |
| 4,317,789 | 3/1982 | Groult et al. | 264/105 |
| 4,481,053 | 11/1984 | Tokuno et al. | 156/157 |
| 4,862,328 | 8/1989 | Morimoto et al. | 264/105 |
| 4,985,296 | 1/1991 | Mortimer, Jr. | 264/175 |

FOREIGN PATENT DOCUMENTS

| | | | |
|---|---|---|---|
| 314772 | 11/1984 | Japan | 264/105 |
| 62-239513 | 10/1987 | Japan | |
| 63-78513 | 4/1988 | Japan | |
| 63-107011 | 5/1988 | Japan | |

*Primary Examiner*—Jan H. Silbaugh
*Assistant Examiner*—Christopher A. Fiorilla
*Attorney, Agent, or Firm*—Ostrolenk, Faber, Gerb & Soffen

[57] ABSTRACT

One method of manufacturing a polarizable electrode for an electric double-layer capacitor includes, in order, the steps of: preforming a kneaded substance of fine carbon powder, a polymer resin containing fluorine, and a liquid lubricant into a sheet-type preform; adjusting the content of the liquid lubricant in the sheet-type preform to 10 to 47 percent by weight; shaping the preform into a prescribed thickness, optionally but advantageously with heated rolls; and then substantially removing the liquid lubricant from the preform. In another disclosed method, first the liquid lubricant is substantially removed, and then the sheet-type preform is rolled with rollers that are heated to substantially 90°–120° C. In either of the above methods, the rollers are controlled to have a circumferential speed of 0.7–5 m/min and the rollers shape the preform into a sheet substantially 0.04 to 0.5 mm in thickness for serving as a polarizable electrode.

9 Claims, 3 Drawing Sheets

1

METHOD OF MANUFACTURING POLARIZABLE ELECTRODE FOR ELECTRIC DOUBLE-LAYER CAPACITOR

This is a continuation-in-part of application Ser. No. 07/490,918 filed on Mar. 8, 1990, now abandoned.

BACKGROUND OF THE INVENTION

1. Field of the Invention

The present invention relates to a method of manufacturing a polarizable electrode for an electric double-layer capacitor.

2. Description of the Background Art

A known electric double-layer capacitor will be schematically described with reference to FIGS. 4 and 5.

As shown in FIG. 5, a known electric double-layer capacitor 1 is generally produced from a plurality of, e.g., six capacitor cells 2, which are coaxially stacked and contained in a cup-shaped case 3.

Each capacitor cell 2, provided in the form of a circular plate, as shown in FIG. 4, comprises a pair of polarizable electrodes 4a and 4b, a separator 5, an annular gasket 6, and a pair of current collectors 7a and 7b which are thermally bonded to upper and lower surfaces of the gasket 6 respectively.

More specifically, the polarizable electrodes 4a and 4b, including solid carbonaceous compacts, are isolated from each other by the electrical insulating separator 5. The separator 5, which is made of a polyolefin microporous film or nonwoven fabric, or paper, is preferably provided with a projecting portion along its peripheral edge. This projecting portion encloses the second polarizable electrode 4b, so as to prevent the polarizable electrodes 4a and 4b from shorting across the respective peripheral portions. The polarizable electrodes 4a and 4b and the separator 5 are fixed to each other by adhesives 8 which are applied to parts of the interfaces therebetween. These polarizable electrodes 4a and 4b and separator 5 are impregnated with an electrolyte solution such as an aqueous solution containing 50 percent by weight of sulfuric acid, for example.

The gasket 6 is formed of a substrate 9, made of ethylene propylene valcanized rubber, which is integrally provided on both surfaces with low-density polyethylene layers 10a and 10b, for example. The current collectors 7a and 7b are formed of polyethylene films which are made conductive by adding a carbon material such as carbon black, for example, to serve as electrical conduction means for the polarizable electrodes 4a and 4b, as well as to airtightly seal the polarizable electrodes 4a and 4b and the separator 5 within the gasket 6.

A required number of, e.g., six capacitor cells 2 having the aforementioned structure are stacked in order to provide a desired rated voltage, as shown in FIG. 5. An electric insulating thermal contraction tube 11 encloses the stacked capacitor cells 2, thereby integrating the same. A cell assembly 12 obtained by such integration is contained in the case 3 under pressure.

Elastic conductive plates 13a and 13b of highly conductive resin or rubber are arranged in the case 3 to be in contact with the upper and lower surfaces of the cell assembly 12 respectively. A terminal assembly 14 is provided on the upper elastic conductive plate 13a. This terminal assembly 14 comprises two terminals 15a and 15b, formed of metal plates, which are attached to each other by an insulating plate 16. The terminal 15a is electrically connected to the upper surface of the cell assembly 12 through the elastic conductive plate 13a. The terminal 15b, which is in contact with the upper edge of the case 3, is electrically connected to the lower surface of the cell assembly 12 through the case 3 and the elastic conductive plate 13b. As understood from such electrical connection arrangements, the elastic conductive plates 13a and 13b are adapted to reduce contact resistances between the upper surface of the cell assembly 12 and the terminal 15a, and between the lower surface of the cell assembly 12 and the bottom surface of the case 3 respectively, thereby stabilizing the electrical connection.

A sealing resin member 17 is applied to cover the opening portion of the case 3. This sealing resin member 17 airtightly forms a seal for the case 3 to supply the electric double-layer capacitor 1 with washability etc. Another thermal contraction tube 18 covers the outer peripheral surface of the case 3, to insulate the same.

In order to reduce the size of the aforementioned electric double-layer capacitor 1 particularly in the vertical direction, i.e., to reduce the height H shown in FIG. 5, it is necessary to reduce the capacitor cells 2, forming the cell assembly 12, in thickness. The capacitor cells 2 are most effectively reduced in thickness by a method of forming the polarizable electrodes 4a and 4b as sheets.

In general, sheet type polarizable electrodes are manufactured by shaping a rubber-like viscous admixture, which is composed of polytetrafluoroethylene (PTFE) resin and a liquid lubricant, into sheets by rolling. The liquid lubricant is prepared from water, alcohol, glycol or the like.

When the sheets are reduced in thickness in the aforementioned method, however, the sheets overlappingly stick to each other due to elongation caused by rubber elasticity of the admixture and adhesion of the liquid lubricant, to make handling substantially impossible. Thus, the minimum size of a manufacturable sheet has been limited to 0.6 mm in thickness.

In order to solve the aforementioned problem, it may be considered to first obtain a sheet-type preform having a certain degree of thickness, then remove the liquid lubricant from the preform, and thereafter finally shape the preform into a thin film by rolling. In this method, however, it is still impossible to manufacture a film which is smaller than 0.6 mm in thickness, due to cracking, fracturing etc. caused by rolling.

To this end, there has been proposed a method of removing the liquid lubricant from a sheet-type preform and thereafter uniaxially or multiaxially drawing the preform, as disclosed in Japanese Patent Laying-Open No. 107011/1988.

According to this method, it is possible to manufacture a sheet which is smaller than 0.6 mm in thickness. However, this is not an industrially proper method since the steps are complicated by the drawing step which is carried out after the rolling step and a long time is required for the drawing step itself.

SUMMARY OF THE INVENTION

Accordingly, an object of the present invention is to provide a method of manufacturing a polarizable electrode for an electric double-layer capacitor, which enables reduction in thickness of the polarizable electrode for reducing the vertical size of the electric double-layer capacitor, and in order to obtain higher productivity.

In order to solve the aforementioned technical problem, the present invention has the following aspects. According to the present invention, a step (starting step) of preforming a kneaded substance of fine carbon powder, a polymer resin containing fluorine, and a liquid lubricant into a sheet is first carried out in every aspect.

In a first aspect of the present invention, the starting step is followed by the steps of:

1-a. removing the liquid lubricant from the preform; and 1-b. shaping the preform into a prescribed thickness with heated rolls.

In a second aspect of the present invention, the aforementioned starting step is followed by the steps of:

2-a. adjusting the content of the liquid lubricant in the preform to 10 to 47 percent by weight;

2-b. shaping the preform into a prescribed thickness with rolls; and 2-c. removing the liquid lubricant from the preform.

In a third aspect of the present invention, the step 2-b in the aforementioned second aspect is replaced by the step of:

3-b. shaping the preform into a prescribed thickness with heated rolls.

In a fourth aspect of the present invention, the aforementioned starting step is followed by the steps of:

4-a. stacking a plurality of preforms at end portions and rolling/joining the same into a continuous long preform;

4-b. removing the liquid lubricant from the long preform; and 4-c. shaping the preform into a prescribed thickness with heated rolls.

According to a fifth aspect of the present invention, the steps 4-b and 4-c in the aforementioned fourth aspect are replaced by the steps of:

5-b. adjusting the content of the liquid lubricant in the preform to 10 to 47 percent by weight;

5-c. shaping the preform into a prescribed thickness with rolls; and 5-d. removing the liquid lubricant from the preform.

In a sixth aspect of the present invention, the step 5-c in the aforementioned fifth aspect is replaced by the step of:

6-c. shaping the preform into a prescribed thickness with heated rolls.

In a seventh aspect of the present invention, the aforementioned starting step is followed by the steps of:

7-a. adjusting the content of the liquid lubricant in the preform to 20 to 47 percent by weight;

7-b. stacking a plurality of preforms at end portions and rolling/joining the same into a continuous long preform;

7-c. shaping the long preform into a prescribed thickness with rolls; and 7-d. removing the liquid lubricant from the preform.

According to an eighth aspect of the present invention, the step 7-c in the aforementioned seventh aspect is replaced by the steps of:

8-c. shaping the preform into a prescribed thickness with heated rolls.

In every aspect of the invention, the preform is rolled between rotating rolls or heated rotating rolls which rotate at a circumferential speed of substantially 0.7 to 5 m/min, and the preform is shaped into a sheet substantially 0.04 to 5 mm. thick.

According to the present invention having the aforementioned various aspects, the fine carbon powder is prepared from at least one of activated carbon and carbon black.

The polymer resin containing fluorine may be prepared from polytetrafluoroethylene (PTFE), ethylene-tetrafluoroethylene copolymer, chlorotrifluoroethylene-ethylene copolymer, vinylidene fluoride copolymer, tetrafluoroethylene-perphloroalkyl vinyl ether copolymer, or the like.

The liquid lubricant may be prepared from water, alcohol, propylene glycol, ethylene glycol, glycerine, white oil or the like.

The mixing ratios of the aforementioned fine carbon powder, the polymer resin containing fluorine and the liquid lubricant are so selected that the kneaded substance contains 100 parts by weight of the fine carbon powder, 0.5 to 30 parts by weight of the polymer resin containing fluorine and 95 to 150 parts by weight of the liquid lubricant, for example.

The "heated rolls" employed in the first, third, fourth, sixth and eight aspects of the present invention are heated within a temperature range of substantially 90° to 120° C., for example.

This temperature range is selected in order to obtain aqueous tensile strength and electrolyte solution absorptivity of the polarizable electrode.

Experiments were carried out to investigate the tensile strength and the electrolytic solution absorptivity of each sheet when the temperature of the rolls was changed in a range 25° to 350° C. The tensile strength was evaluated by measuring a tensile force value when a test piece 20 mm in width and 50 mm in length was torn at a pulling rate of 12 mm/min. The Table 1 below shows the results of measurement of tensile strength of each test piece, in which "A" denotes tensile strength or more than 50 g, "B" denotes 40 to 50 g, "C" 30 to 40 g, and "D" less than 30 g. If the tensile strength is less than 40 g, the sheet cannot withstand its handling, causing defects in the polarizable electrode when an electric double-layer capacitor is manufactured. If the tensile strength is less than 30 g, the sheet is cracked during its handling.

Table 1 also shows the absorptivity of each test piece. The absorptivity was evaluated by measuring the period of time from the time 4 µl of 50 wt % aqueous solution of $H_2SO_4$ was dropped onto a sheet measuring 5 by 5 mm to the time the drop disappeared by penetrating into the sheet. In the Table, "A" denotes a time period of less than 3 minutes, "B" denotes 3 to 4 minutes, and "C" more than 4 minutes. If the time period is less than 3 minutes, the sheet can be put to practical use for a polarizable electrode.

TABLE I

| Temperature of Rolls (°C.) | Tensile Strength | Absorptivity |
|---|---|---|
| 25 | D | A |
| 50 | C | A |
| 90 | B | A |
| 105 | B | A |
| 120 | B | A |
| 150 | B | B |
| 200 | A | B |
| 350 | A | C |

As understood from the above Table, heating the rolls at a temperature of 90° to 120° C. produces the optimum results.

The importance of the absorptivity will be briefly described. In an electric double-layer capacitor, since the capacitor function is effected by charge accumulated at the interface between the polarizable electrode and the electrolytic solution, the absorptivity of the electrolytic solution is an important characteristic factor for a polarizable electrode sheet, in addition to its strength. If the absorptivity is not secured, the electric double-layer capacity is not implemented.

It has conventionally been regarded as technically difficult to secure the necessary absorptivity using lyophobic PTFE as binder. With the present invention, however, it has not been found that the relative relationship among the mixing ratio, the temperature of the heated rolls and the speed of the rolls is effective for manufacturing polarizable electrode sheets, having thickness of 0.04 to 0.5 mm, for electric double-layer capacitors.

We have also measured the capacitance of an electric double-layer capacitor obtained from each test piece as a function of rolling temperature, which is shown in Table 2 below.

TABLE 2

| Temperature of Rolls (°C.) | Capacitance (mF) |
|---|---|
| 25 | —[1] |
| 50 | 55[2] |
| 90 | 60 |
| 105 | 60 |
| 120 | 60 |
| 150 | 45 |
| 200 | 43 |
| 350 | 20 |

The notes in Table 2 indicate as follows:
1. Trial production was impossible.
2. 50% of trial products shorted. An average value of the remaining 50% of the trail products was 55 mF.

Thus, it is seen that optimum capacitance is obtained with a heating temperature of 90°–120° C.

These and other objects, features, aspects and advantages of the present invention will become more apparent from the following detailed description of the present invention when taken in conjunction with the accompanying drawings.

DETAILED DESCRIPTION OF THE INVENTION

The present invention has been proposed in view of the fact that it is optimal for industrial purposes to reduce the thickness of a preform, from which a liquid lubricant has been removed, not by drawing but by rolling, thereby simplifying the manufacturing process and reducing the time required for the steps which reduce the thickness of the preform.

Figure 1:
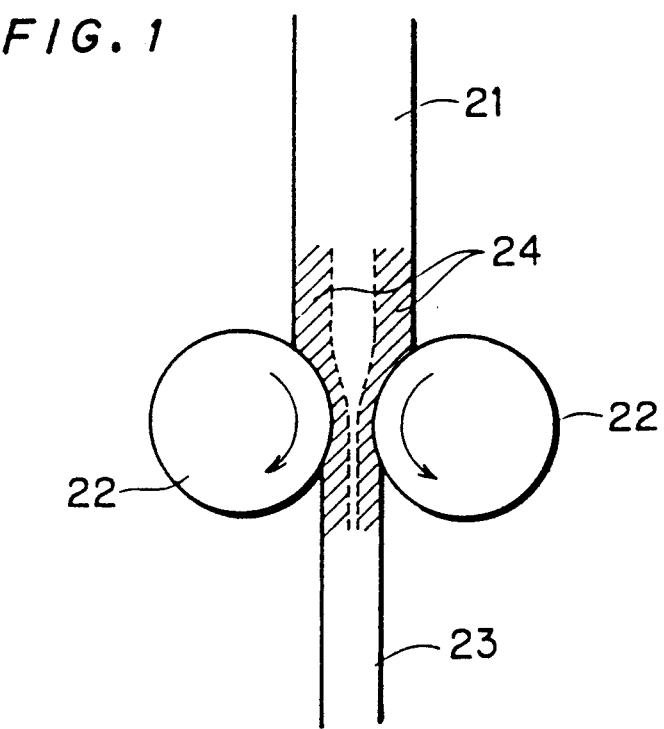
FIG. 1 illustrates a rolling step which is applied to a preform.

To this end, the inventors have studied a mechanism for reducing the thickness of a preform by rolling, and have recognized the following fact:

As shown in FIG. 1, a preform 21 is worked into a rolled sheet 23 through a pair of rolls 22. Referring to FIG. 1, a compression shearing force is applied to the hatched surface layers 24 by rolling. The surface layers 24 must be quickly deformed and elongated when the preform 21 passes through the rolls 22. It is considered that cracking or fracturing is caused when the percentage of the surface layers 24 is increased with respect to the overall rolled sheet 23, i.e., when the thickness of the rolled sheet 23 is reduced, since the preform 21 cannot follow deformation. In general, therefore, the minimum thickness of the sheet 23 obtained by rolling has been restricted to 0.6 mm.

Figure 2:
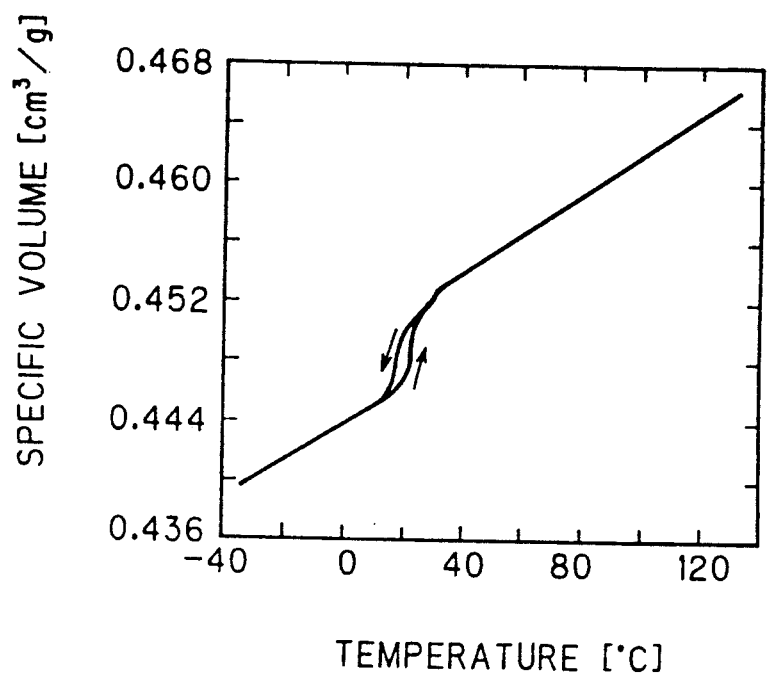
FIG. 2 is a graph showing a relation between specific volume and temperature of polytetrafluoroethylene.
Figure 3:
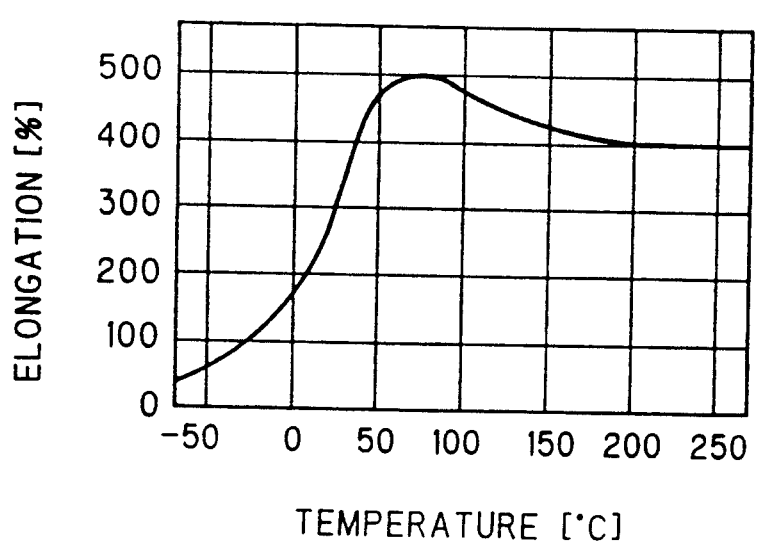
FIG. 3 is a graph showing a relation between elongation and temperature as to pulled polytetrafluoroethylene.

As shown in FIG. 2, polytetrafluoroethylene (PTFE) has room temperature transition points of about 20° C. and about 30° C., at which its specific volume is changed. This is considered as being based on a reversible change of the crystal structure around the room temperature. Elongation of PTFE is abruptly increased, as shown in FIG. 3, when the PTFE is heated to a temperature exceeding the room temperature transition points.

Thus, it is considered that PTFE may be heated to a temperature exceeding the room temperature transition points to facilitate deformation, so that deformation of the surface layers 24 exposed to compression shearing force follows rolling.

In this regard, a preform was worked with rolls which were heated to a temperature exceeding room temperature, whereby it became possible to easily and quickly manufacture a sheet smaller than 0.6 mm in thickness, which could not be manufactured by a conventional method.

Although the above consideration as to the room temperature transition points has been made with respect to PTFE, it also applies to the other materials for the polymer resin containing fluorine mentioned above.

According to another aspect of the present invention, it has been recognized that a thin sheet can be obtained by rolling without heating the rolls, by adjusting the content of the liquid lubricant in the preform in any stage before the rolling step. When the preform is brought into the so-called semi-dried state by adjusting the content of the liquid lubricant in the preform to within a range of 10 to 47 percent by weight, no problem is caused in handling while the residual liquid lubricant exhibits a plasticizing effect. It is considered that the sheet can be reduced in thickness since the surface layers exposed to compression shearing force can be easily deformed by such a plasticizing effect of the liquid lubricant.

In this case, the preform to be rolled, which contains the liquid lubricant to an extent that does not prevent handling, is obtained by semi-drying a compact containing a sufficient amount of the liquid lubricant. It is impossible to prepare such a sheet from a kneaded substance which originally contains only a small amount of the liquid lubricant, due to inferior rollability.

When the preform is semi-dried in the aforementioned manner and then stacked with other preforms at end portions thereof and rolled/joined in order to obtain a continuous long preform, it is preferable to adjust the content of the liquid lubricant in the preform within a range of 20 to 47 percent by weight.

According to the present invention, it is possible to easily manufacture a sheet for serving as a polarizable electrode which is substantially 0.04 to 0.5 mm in thickness, and more particularly 0.20 to 0.25 mm in thickness, for example, which cannot be manufactured by a conventional rolling method, within a short time. Thus, the vertical size of an electric double-layer capacitor can be advantageously reduced by employing polarizable electrodes obtained in such a manner.

In the invention, the rolls are controlled so that their circumferential speed is substantially 0.7 to 5 m/min. It is limited to this range because, as the inventors have shown by experiment, when it is less than 0.7 m/min. The absorptivity of the electrode will be poor and as a result, the obtainable capacitance will be small. On the other hand, when the roller speed exceeds 5 m/min, the tensile strength of the electrode will decrease, which will also reduce the obtainable capacitance.

The thickness of the sheets obtained is substantially 0.04 to 0.5 mm. It must be smaller than that of conventional electrodes in order to reduce the height of the electric double-layer capacitors to be manufactured. A thickness of 0.04 to 0.5 mm is found to be practicable with this method. Greater thicknesses are not effective to reduce the height of the finished product. On the other hand, tensile strength is inferior with a sheet less than 0.04 mm in thickness.

We have also measured the tensile strength and the absorptivity of sheets obtained with the circumferential speed of rolls being varied from 0.5 m/min to 10 m/min and the temperature of rolls being a constant 120° C. in Example 1 of the present specification (below), and the capacitance of electric double-layer capacitors obtained from these sheets. The results are shown in Table 3 below.

TABLE 3

| Circumferential Speed of Rolls (m/min.) | Tensile Strength | Absorptivity | Capacitance (mF) |
| --- | --- | --- | --- |
| 0.5 | B | B | 48 |
| 0.7 | B | A | 60 |
| 2 | B | A | 60 |
| 5 | B | A | 60 |
| 10 | C | A | 55* |

In this Table, the meaning of the asterisk is as follows: [30% of the trial products shorted. An average value of the remaining 70% of the trial products was 55 mF.

In the Table above, "A", "B" and "C" denote the same evaluating ranks as those described above in connection with the tensile strength and absorptivity measurements of Table 1.

It is seen that that optimum results are obtained with circumferential speed in the range of 0.7-5 m/min.

DETAILED DESCRIPTION OF EXAMPLES OF THE INVENTION

Example 1

120 parts by weight of propylene glycol, serving as a liquid lubricant, was added to 100 parts by weight of activated carbon powder which was obtained by pulverizing activated carbon fiber prepared from polyacrylonitile to pass through 200 meshes, and these materials were mixed with each other by a spiral mixer. Then, 5 parts by weight of aqueous PTFE dispersion ("Polyfluon D-1" by Daikin Industries, Ltd.) was added to/kneaded with the mixture, to obtain a rubber-like viscous admixture.

The viscous admixture was worked with rolls to obtain a sheet-type preform of 1 mm in thickness.

Then the preform was reduced in thickness by rolls which were heated to 90° to 120° C., to manufacture a sheet of 0.25 mm in thickness effect of such rolling was recognized within a temperature range of 90° to 120° C. in consideration of facility of rolling/deformation, workability and water repellency.

The sheet was manufactured at a rate of 2 m/min.

Reference Example 1

The preform of Example 1 was reduced in thickness by drawing, to manufacture a sheet of 0.25 mm in thickness.

The rate for manufacturing the sheet was limited to 0.5 m/min. It is understood that this rate is extremely slower as compared with Example 1.

Example 2

* (Outline) In comparison with Example 1, a semi-dried preform was employed to enable reduction in thickness at the room temperature. *

A sheet-type preform of 1 mm in thickness was prepared in a similar manner to Example 1.

Then the content of a liquid lubricant in the preform was adjusted to 10 to 47 percent by weight through a hot air drier at a temperature of 90° C.

This preform was reduced in thickness by rolling at the room temperature, to manufacture a sheet of 0.25 mm in thickness. Thereafter the liquid lubricant was completely removed from the sheet, to apply the sheet to a polarizable electrode. No change was caused in the thickness of the sheet at this time.

Thus, it was possible to manufacture a thin sheet without heating the rolls, since the surface layers of the sheet, which were exposed to compression shearing force, were easily deformed by a plasticizing action of the residual liquid lubricant.

Example 3

* (Outline) In comparison with Example 2, thickness was reduced by heated rolls, to enable improvement of sheet strength and further reduction in thickness. *

A sheet-type preform containing 10 to 47 percent by weight of a liquid lubricant was prepared in a similar manner to Example 2.

This preform was reduced in thickness by rolls which were heated to 90° to 120° C., to manufacture a sheet of 0.20 mm in thickness. Thereafter the liquid lubricant was completely removed from the sheet, to apply the sheet to a polarizable electrode. No change was caused in the thickness of the sheet at this time.

In Examples 1 and 2, fine cracks observed before reduction in thickness still remained after rolling, and cracking may have been caused from such portions. In Example 3, on the other hand, such cracks disappeared and absolutely no cracking was caused after rolling. Further, while the minimum thickness was limited to 0.25 mm in Examples 1 and 2, it was possible to easily obtain a sheet of 0.20 mm in thickness in Example 3.

According to Examples 1 to 3, it was possible to easily and quickly manufacture a thin sheet by rolling in contrast to Reference Example 1, the method of drawing a sheet-type preform.

Example 4

* (Outline) Elongation of Example 1 *

In Examples 1 to 3, every preform was reduced in thickness, and hence the length of the obtained sheet was about 4 m at the most. Thus, it was impossible to obtain a continuous long sheet. Example 4 was adapted to obtain a continuous long sheet.

A sheet-type preform of 1 mm in thickness was prepared in a similar manner to Example 1.

A plurality of such preforms were stacked at end portions and joined with each other by rolls, to obtain a continuous long preform. The stacked portions of the preforms were easily deformed by a plasticizing action of a liquid lubricant contained in the preforms, to enable joining.

Then, the liquid lubricant was removed from the long preform through a hot air drier at a temperature of 200° C.

Thereafter the long preform was reduced in thickness by rolls which were heated to 90° to 120° C., to manufacture a continuous sheet of 0.25 mm in thickness.

Example 5

* (Outline) Elongation of Example 2 *

A continuous long sheet type preform was prepared in a similar manner to Example 4.

Then, the amount of a liquid lubricant contained in the long preform was adjusted to 10 to 47 percent by weight through a hot air drier at a temperature of 90° C.

The preform was reduced in thickness by rolling at the room temperature, to manufacture a continuous sheet of 0.25 mm in thickness.

Thereafter the liquid lubricant was completely removed from the sheet, to apply the sheet to a polarizable electrode. No change was caused in the thickness of the sheet at this time.

Example 6

* (Outline) Elongation of Example 3 *

A continuous long sheet type preform containing 10 to 47 percent by weight of a liquid lubricant was prepared in a similar manner to Example 5.

Then the preform was reduced in thickness by rolls which were heated to 90° to 120° C., to manufacture a sheet of 0.20 mm in thickness. Thereafter the liquid lubricant was completely removed from the sheet, to apply the sheet to a polarizable electrode. No change was caused in the thickness of the sheet at this time.

In Examples 4 and 5, fine cracks observed before reduction in thickness still remained after rolling, and cracking may have been caused from such portions. In Example 6, on the other hand, such cracks disappeared and absolutely no cracking was caused after rolling.

Example 7

* (Outline) A semi-dried preform was elongated and reduced in thickness at the room temperature. *

A sheet-type preform was prepared to contain 20 to 47 percent by weight of a liquid lubricant.

A plurality of such preforms were stacked at end portions and joined with each other by rolls, to obtain a continuous long preform. It was possible to join the preforms by a plasticizing action of the liquid lubricant, the content of which was 20 to 47 percent by weight.

The aforementioned long preform was reduced in thickness by rolling at the room temperature, to manufacture a continuous sheet of 0.25 mm in thickness.

Thereafter the liquid lubricant was completely removed from the sheet, to apply the sheet to a polarizable electrode. No change was caused in the thickness of the sheet at this time.

Example 8

* (Outline) A semi-dried preform was elongated and reduced in thickness by heated rolls. *

A continuous long sheet type preform containing 20 to 47 percent by weight of a liquid lubricant was prepared in a similar manner to Example 7.

This preform was reduced in thickness by rolls which were heated to 90° to 120° C., to manufacture a sheet of 0.20 mm in thickness.

Thereafter the liquid lubricant was completely removed from the sheet, to apply the sheet to a polarizable electrode. No change was caused in the thickness of the sheet at this time.

In Example 7, fine cracks observed before reduction in thickness still remained after rolling, and cracking may have been caused from such portions. In Example 8, on the other hand, such cracks disappeared and absolutely no cracking was caused after rolling.

Table 4 shows the results of the aforementioned Examples 1 to 8 and Reference Example 1.

TABLE 4

|  |  | Method of Reduction | Thickness of Sheet (mm) | Speed of Sheet Forming |
|---|---|---|---|---|
| Example | 1 | Rolling | 0.25 | 2 m/min. |
|  | 2 | " | 0.25 | 2 m/min. |
|  | 3 | " | 0.20 | 2 m/min. |
|  | 4 | " | 0.25 | 2 m/min. |
|  | 5 | " | 0.25 | 2 m/min. |
|  | 6 | " | 0.20 | 2 m/min. |
|  | 7 | " | 0.25 | 2 m/min. |
|  | 8 | " | 0.20 | 2 m/min. |
| Reference Example | 1 | Drawing | 0.25 | 0.5 m/min. |

As understood from Table 4, it is easy to manufacture a sheet of 0.20 to 0.25 mm in thickness for a polarizable electrode, which could not be manufactured in a conventional rolling method, within a short time.

Figure 4:
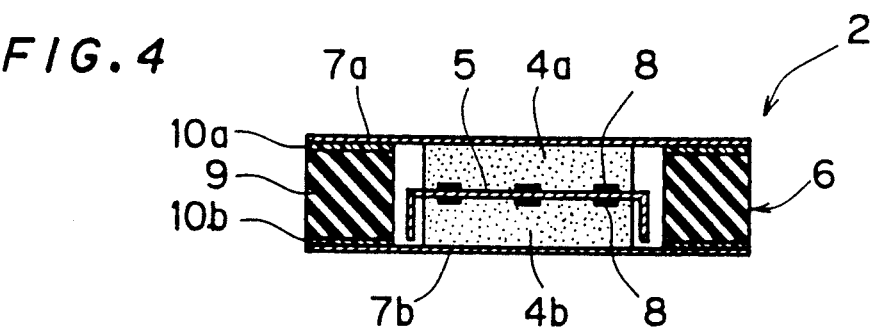
FIG. 4 is a sectional view showing a capacitor cell included in an electric double-layer capacitor.
Figure 5:
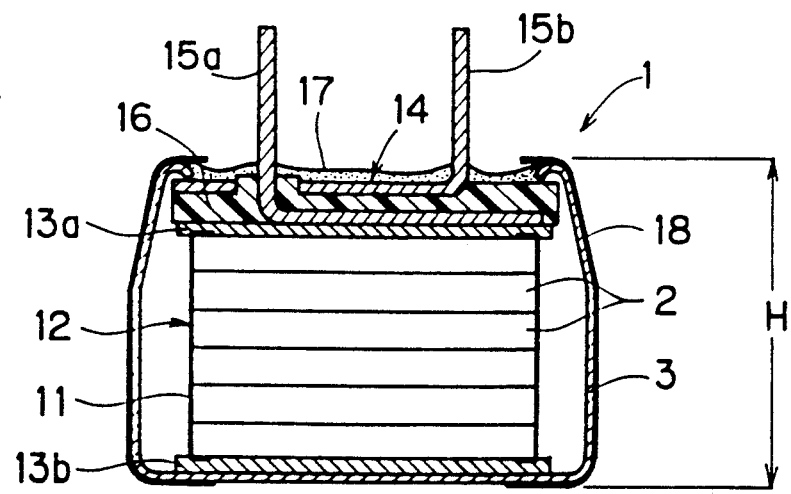
FIG. 5 is a sectional view showing an electric double-layer capacitor formed from a plurality of capacitor cells shown in FIG. 4.

The sheets obtained in Examples 1 to 8 and Reference Example 1 were punched into circular plates to prepare the polarizable electrodes 4a and 4b shown in FIG. 4. These polarizable electrodes 4a and 4b were adapted to form capacitor cells 2, which were integrated into electric double-layer capacitors 1 as shown in FIG. 5. Table 5 shows the results of measurement of product heights and capacitances of such electric double-layer capacitors 1. Referring to Table 5, the capacitances were calculated by charging the samples with constant currents of 2 mA and measuring times required for increasing terminal-to-terminal voltages from 2 V to 4 V.

TABLE 5

|  |  | Product Height (H) | Capacitance |
|---|---|---|---|
| Example | 1 | 5.5 mm | 60 mF |
|  | 2 | 5.5 mm | 59 mF |
|  | 3 | 5.0 mm | 51 mF |
|  | 4 | 5.5 mm | 59 mF |
|  | 5 | 5.5 mm | 60 mF |
|  | 6 | 5.0 mm | 50 mF |
|  | 7 | 5.5 mm | 59 mF |
|  | 8 | 5.0 mm | 51 mF |
| Reference Example | 1 | 5.5 mm | 58 mF |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a polarizable electrode for an electric double-layer capacitor, comprising the following steps in the order recited:

forming a kneaded substance containing fine carbon powder, a polymer resin containing fluorine, and a liquid lubricant into a sheet preform;

semi-drying said sheet preform to adjust the content of said liquid lubricant in said sheet preform to a final liquid lubricant content of 10 to 47 percent by weight;

passing said sheet preform having the final liquid lubricant content of 10 to 47 percent by weight through rolls rotated at a circumferential speed of substantially 0.7–5 m/min to shape said sheet preform into a sheet substantially 0.04 to 0.5 mm in thickness for serving as said polarizable electrode.

2. A method in accordance with claim 1, wherein heated rolls are employed in said step of passing said sheet through rolls.

3. A method in accordance with claim 2, wherein said rolls are heated to a temperature of 90° to 120° C.

4. A method of manufacturing a polarizable electrode for an electric double-layer capacitor, comprising the following steps in the order recited:

forming a kneaded substance of fine carbon powder, a polymer resin containing fluorine, and a liquid lubricant into a sheet preform;

stacking a plurality of said sheet preforms at end portions thereof and rolling and thereby joining said sheet performs into a continuous long preform;

semi-drying said sheet preform to adjust the content of said lubricant in said long preform to 10 to 47 percent by weight;

shaping said long preform with rolls rotated at a circumferential speed of substantially 0.7 to 5 m/min, to shape said long preform into a sheet substantially 0.04 to 0.5 mm in thickness; and removing said liquid lubricant from said sheet.

5. A method in accordance with claim 4, wherein heated rolls are employed in said step of shaping said long preform with rolls.

6. A method in accordance with claim 5, wherein said rolls are heated to a temperature of 90° to 120° C.

7. A method of manufacturing a polarizable electrode for an electric double-layer capacitor, comprising the following steps in the order recited:

forming a kneaded substance of fine carbon powder, a polymer resin containing fluorine, and a liquid lubricant into a sheet preform;

semi-drying said sheet preform to adjust the content of said liquid lubricant in said sheet preform to 20 to 47 percent by weight;

stacking a plurality of said sheet preforms at end portions thereof and rolling and thereby joining the same into a continuous long preform;

shaping said long preform with rolls rotated with a circumferential speed of substantially 0.7 to 5 m/min, to shape said long preform into a sheet substantially 0.04 to 0.5 mm in thickness; and removing said liquid lubricant from said sheet.

8. A method in accordance with claim 7, wherein heated rolls are employed in said step of shaping said long preform with rolls.

9. A method in accordance with claim 8, wherein said rolls are heated to a temperature of 90° to 120° C.

* * * * *